Sept. 16, 1930.  A. J. VASSELLI  1,775,978
AUTOMATIC BRAKE AND CLUTCH CONTROL FOR AUTOMOBILES
Filed Aug. 17, 1928   3 Sheets-Sheet 1
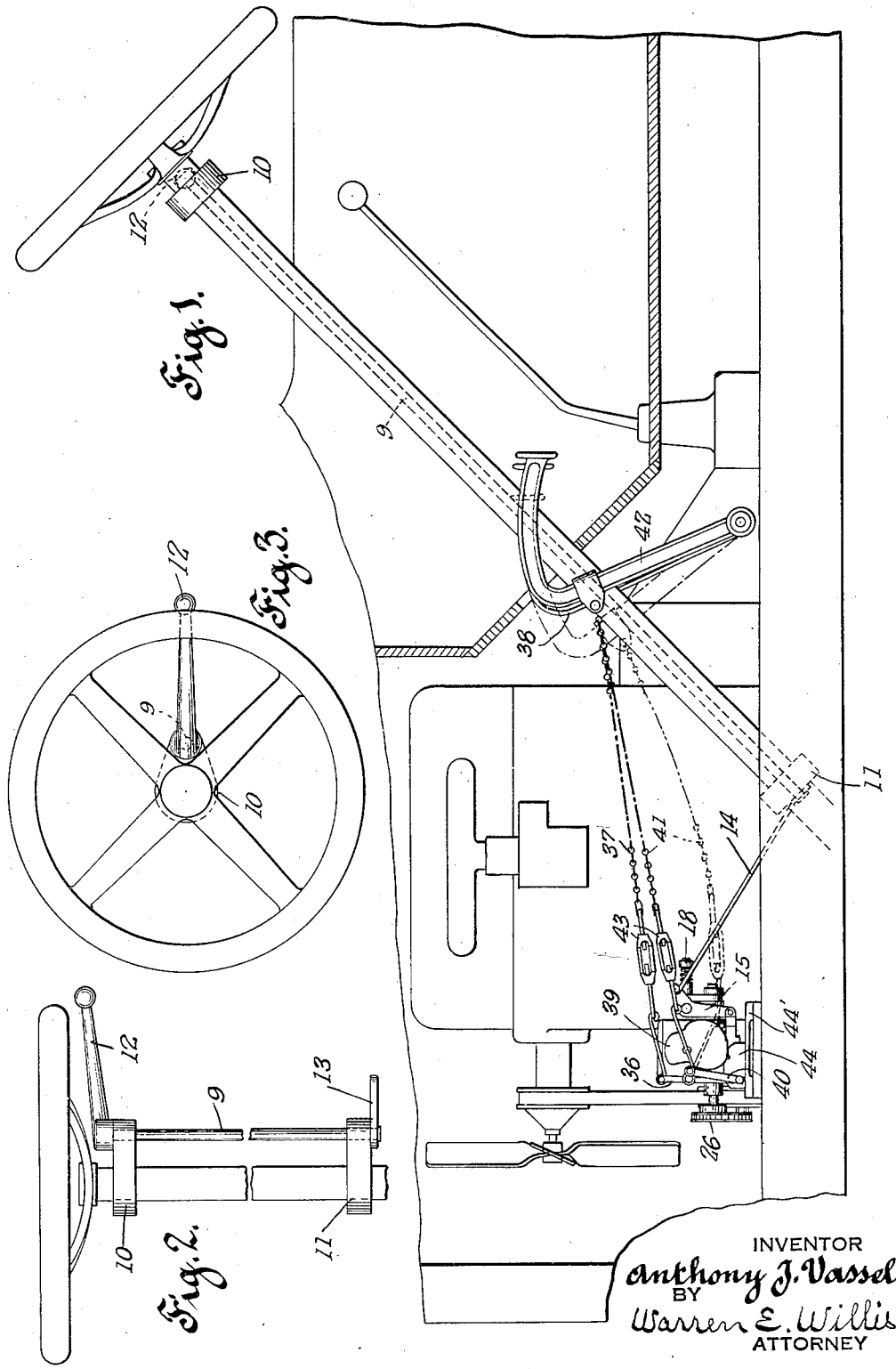

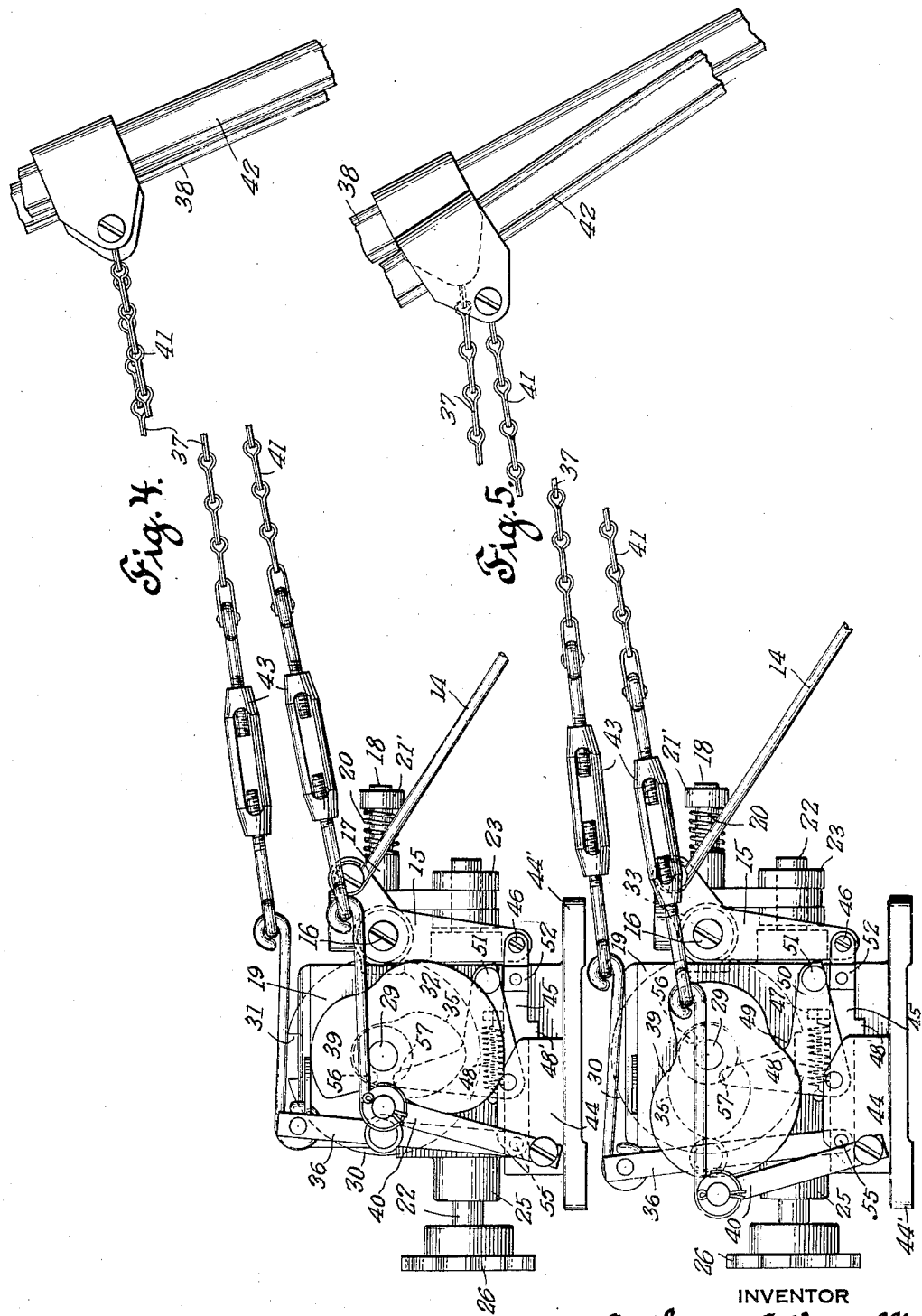

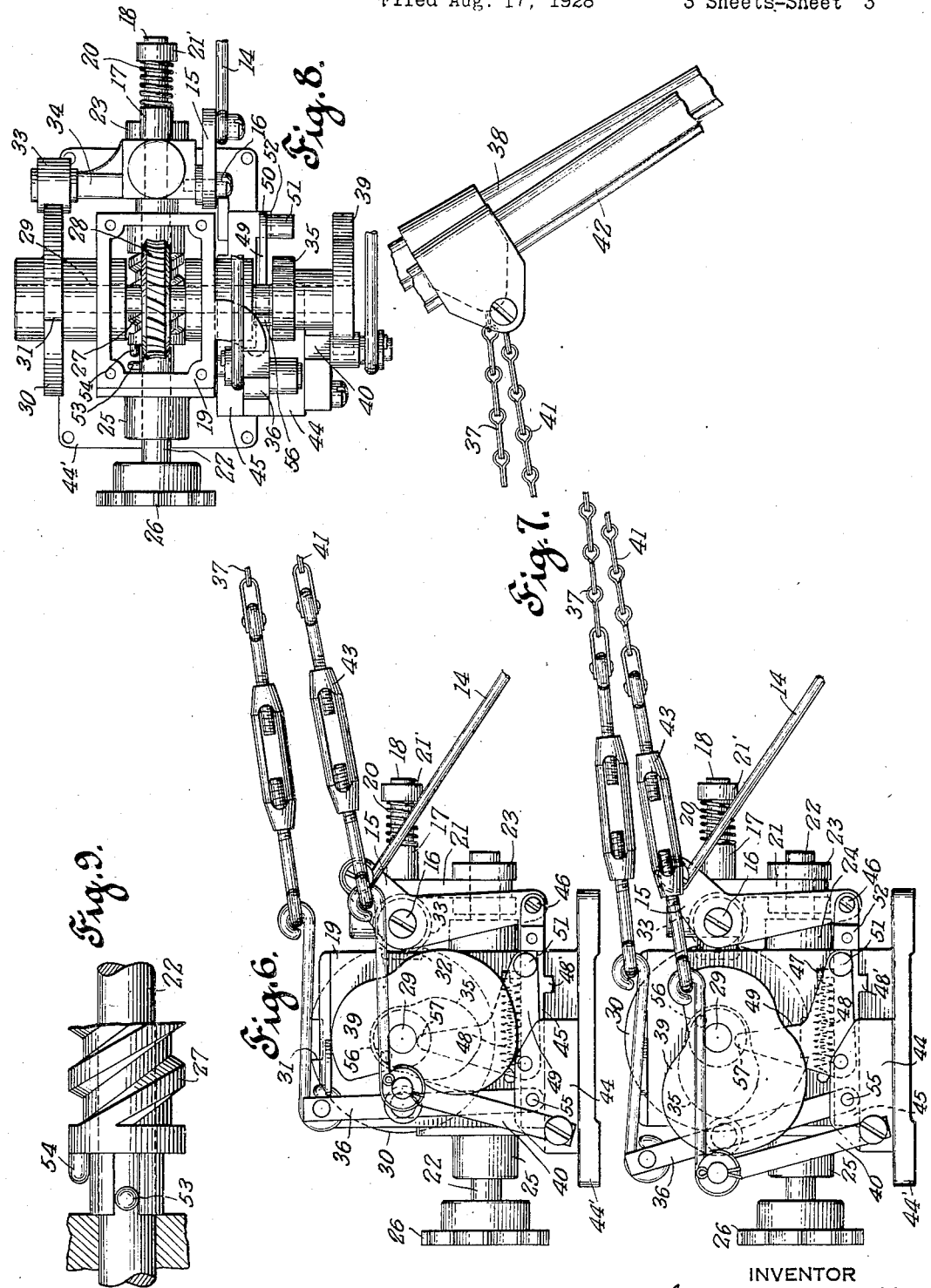

Patented Sept. 16, 1930

1,775,978

UNITED STATES PATENT OFFICE

ANTHONY J. VASSELLI, OF NEWARK, NEW JERSEY

AUTOMATIC BRAKE AND CLUTCH CONTROL FOR AUTOMOBILES

Application filed August 17, 1928. Serial No. 300,191.

This invention relates to brake and clutch operating devices as applied to motor vehicles of the automobile type and other structures of similar nature.

Ordinarily the brake and clutch mechanisms of such vehicles are controlled by independent levers each having a pedal, thereby requiring the use of both feet, while the hands are used on the steering wheel, gear shifting, giving signals, etc. requiring constant alertness on part of the driver and rendering an extended drive extremely tiresome.

Not only is the mind of the driver steadily occupied, but the muscles of the feet and ankles become tired by the unnatural angle necessarily assumed by the feet in operating the pedals and in relaxing the same, such movements being quite fatiguing when long continued. Also, it frequently happens that the foot of a driver, when applying the foot brake, accidentally slips from the brake pedal on to the accelerator pedal, and speeds up the engine, thus causing, in many cases, very serious accidents.

It is therefore one of the objects of the present invention to provide a mechanism, including a lever, which, by the merest touch of the hand, without releasing its grip on the steering wheel, will automatically release the clutch and apply the brakes.

A further feature is in the provision of means which utilize the power of the motor in automatically stopping and starting the car, without recourse to the usual foot pedals, although the same may remain and be operated, if desired, in the customary manner.

Another purpose is to produce a device by which the speed of the car may be automatically reduced, and a gradual slowing, or a sudden stop, made by a smooth and even pressure of applying the brakes, substantially without exertion on part of the driver.

These important features are attained, together with others, such as simplicity, longevity and positive performance, by the novel and practical construction, combination and arrangement of parts, as hereinafter described and shown in the accompanying drawings, forming a material part of this disclosure, and in which:—

Figure 1 is a side elevational view showing the manner in which the device is applied to an ordinary automobile.

Figure 2 is a fragmentary plan view of the steering column showing the manner in which an element of the device is mounted thereon.

Figure 3 is a plan view of the steering wheel showing the relative position of the hand control lever for the device.

Figure 4 is an elevational view of the device showing the position of the parts when the brakes are released and the clutch engaged.

Figure 5 is a similar view showing the position of parts to depress the brake and clutch pedals.

Figures 6 and 7 are elevational views showing the positions assumed by the parts during the process of quickly applying the brakes.

Figure 8 is a top plan view of the device.

Figure 9 is a detail view of the method of clutching a worm to a rotating shaft.

Referring to Figure 1, it will be seen that a rod 9 is rotatably carried by collars 10 and 11 mounted on the steering post of an automobile. The upper extremity of the rod 9 has fixed to it a hand lever 12 and the lower extremity of the rod is fixed to an arm 13, having its outer extremity connected to a link 14 engaging the short arm 15 of a bell-crank lever, pivoted at 16 to a sleeve 17 slidable on a stud 18 supported by a gear casing 19. The stud is encircled by a compression spring 20 which abuts the sleeve and a collar 21' fixed on the stud to resist movement of the sleeve.

Integral with the sleeve 17 is a fork 21 which embraces a shaft 22 and engages a collar 23 fixed to the shaft which is slidably positioned in bearings 24—24 integral with the casing 19. A gear 26, or sprocket wheel, is fixed to the shaft 22, the gear being adapted to be connected by other gears or by a chain and sprocket arrangement to a shaft constantly rotated by the motor. Consequently, it will be seen that the gear 26 and shaft 22 are constantly rotated by power from the motor when operating.

The casing 19 carries a set of reduction gears comprising a worm 27 loosely mounted on the shaft 22, the worm engaging a worm-wheel 28 fixed to a spindle 29 journalled in the walls of the casing.

Fixed to the spindle 29, at one side of casing 19, is a disc 30 having two notches 31 and 32 engageable by a roller 33 mounted on a stud 34, the latter being fixed to and moving with the sleeve 17.

Also fixed to the spindle 29, on the other side of the casing 19, is a cam 35 to engage a roll carried by a lever 36, which is connected by a chain 37 to the brake pedal 38 of the automobile.

A second cam 39 is also fixed to the shaft 29 and engages a roll carried by a lever 40 connected by a chain 41 to the clutch pedal 42. Turnbuckles 43 are provided in the chains to enable adjustment as to length from time to time.

The lever 40 is pivoted to a block 44 on the base 44′, the latter being attached to a convenient support on the frame of the automobile. The lever 36 is pivoted to one end of a plate 45, slidable in a groove in the block 44, the long arm of the lever 15 being pivoted at 46 to the other end of the plate. A pin 47, projecting from the upper surface of plate 45, is connected to an end of a spring 48, the other end of the spring being fixed to the wall of the casing 19 to normally urge the plate 45 forwardly. A lug 48′ projects from the under surface of the plate 45 to limit the forward movement by engaging the block 44. A bell-crank 49 is pivoted to the block 44 and its lower arm 50 has a laterally projecting lug 51, and the end of the arm 50 is adapted to engage a lateral lug 52 on the plate 45, this device constituting a latch.

In operation, when it is desired to gradually stop the automobile, the operator presses down on the hand lever 12 and this action, through the intermediate system of links and levers, pulls the lever 15 to the rear, the lever pivoting about the fulcrum 46. This movement of the lever forces the sleeve 17 rearwardly against the action of spring 20 and withdraws roller 33 from the notch 32, in the disc 30. At the same time, the fork 21, fixed to sleeve 17, slides the shaft 22 rearwardly to cause the pin 53 on the shaft to engage the pin 54 on the worm 27, thus clutching it to the shaft to rotate the worm 27, worm-wheel 28, disc 30 and cams 35 and 39. A slight rotation of disc 30 prevents further engagement of roller 33 in the notch 32, and the operator may then release the hand lever 12, the clutching engagement between the shaft 22 and worm 27 being maintained, since the roller 33 is urged rearwardly by the disc 30 and holds the sleeve 17 in such a position against the action of the spring 20. The gears and cams are now rotated by power derived from the automobile motor.

As the cams rotate, the lever 40 is engaged by the cam 39 to gradually draw the clutch pedal down, and then lever 36 is engaged by cam 35 to draw the brake pedal down. It should be noted that the clutch and brake pedals move down together, the clutch pedal starting its downward movement slightly in advance of the brake pedal.

The pedals are drawn downward until the disc 30 has rotated sufficiently to allow the roller 33 to fall into the notch 31, at which time the spring 20 will force the sleeve 17 and shaft 22 forward to unclutch the worm 27 from the shaft 22. The automobile clutch now has been disengaged and the brakes have been applied.

To re-engage the clutch and release the brakes, the operator presses down on the lever 12, in the same manner as heretofore explained, to move the sleeve 17 rearwardly, disengaging the roller 33 from the notch 31 and to cause the clutch pin 53 to engage the pin 54. The gears, disc, and cams will again be rotated in the same direction by power from the motor and the cams gradually decrease their pressure on the levers 36 and 40, allowing the clutch and brake pedals to return to their released positions, at which time rollers 33 falls into notch 32.

The movements of the parts described above give a gradual release of the clutch and a smooth gradual application of the brakes so that the automobile will be stopped without jarring effects. However, it is frequently necessary to apply the brakes rapidly and under such circumstances the operator first raises the lever 12, to cause the intermediate lever and link system to move the lever 15 forward about the pivot 16, which action causes the arm of the lever pivoted at 46 to move towards the rear, carrying with it the plate 45 against the action of the spring 48 until the end of arm 50 falls into engagement with the lug 52, preventing the return of the plate to its initial position. This action, it will be seen, moves the fulcrum 55 of the lever 36 towards the rear, nearer to the cam 35, it having been found that a movement of about three-eighths of an inch is sufficient.

The operator then depresses the lever 12 to cause the shaft 22 to engage the worm 27, causing the disc 30 and cams 35—39 to rotate as above described, the cam 39 acting upon the lever 40 in the usual manner to draw the clutch pedal down; but, since the fulcrum 55 is now nearer to the cam 35, the lever 36 is acted upon with greater force and moved rapidly through a greater arc than is the case when a gradual stop is desired. The automobile will therefore be brought to a quick stop with the brakes forcibly applied.

When the lever 12 is again depressed, to allow the pedals to return to their raised positions, releasing the brakes and cause the clutch to engage, a pin 56, projecting from a side of the cam 35, strikes the arm 57 of the bell-crank to rotate the latter and withdraw the arm 50 from engagement with the lug 52 on the plate 45, and the spring 48 returns the plate 45 to its normal position, moving the fulcrum 55 into position for gradual application of the brakes.

In order to insure that the device will be at all times in a condition for quick application of the brakes, the cam 35 strikes the projection 51 on the arm 50 to force that arm down against the upper surface of the plate 45, in the event that the arm is frictionally held in a raised position.

From the above description it will be seen that there has been provided an effective device for utilizing the power of the automobile motor to disengage the clutch and apply the brakes, the device being readily placed in operation by a slight pressure of an operator's hand on the hand lever 12. It should be noted that the device does not interfere with the normal operation of the clutch and brake pedals by foot pressure in the usual manner, the flexible connections from the levers 36 and 40 to the pedals making this feature possible. The device enables the brakes to be automatically applied gradually and the clutch released smoothly so that there are no jerks and jars experienced in the stopping of the automobile. Also, in the case of an emergency, the device is adapted to rapidly apply the brakes forcibly in stopping the automobile as quickly as heretofore has been possible by any other means.

The foregoing disclosure is to be regarded as descriptive and illustrative only, and not as restrictive or limitative of the invention, of which obviously an embodiment may be constructed, including many modifications, without departing from the general scope herein indicated and denoted in the appended claims.

Having thus described the invention, what is claimed as new and desired to secure by Letters Patent, is:—

1. A clutch and brake control device for an automobile comprising a shaft constantly rotated by the automobile motor, a worm loosely mounted on the shaft and adapted to be clutched to the shaft to rotate therewith, a worm-wheel engaging the worm, a spindle upon which the worm wheel is fixedly mounted, a pair of cams fixed to the spindle, a pair of levers engaging said cams, one of the levers being connected to the brake pedal and the other lever connected to the clutch pedal, and means for moving the rotating shaft into clutching engagement with the worm.

2. A clutch and brake control device comprising a shaft adapted to be constantly rotated, a spindle, a pair of cams fixed to the spindle, a pair of levers engaged by the cams, one of the levers being connected to a clutch pedal and the other lever connected to the brake pedal, and means for connecting the spindle to the shaft to rotate therewith.

3. In a clutch and brake control device, a gear casing, a stud projecting from the casing, a sleeve slidably mounted on the stud, a collar on the stud, a compression spring positioned between the sleeve and the collar to resist movement of the sleeve, a stud projecting from the sleeve, a roller carried on the end of the second stud, a spindle journalled in the walls of the casing, and a disc fixed to the spindle, said disc having a pair of notches adapted to receive the roller.

4. In a clutch and brake control device, a support, a stud projecting from the support, a sleeve slidably mounted on the stud, means to resiliently resist movement of the sleeve rearwardly, a spindle rotatably mounted on the support, and means associated with the spindle and the sleeve to hold the sleeve in a rearward position against the action of the resilient means when the spindle is rotated.

5. In a clutch and brake control device, a support, a stud projecting from the support, a sleeve slidably mounted on the stud, means to resiliently resist movement of the sleeve rearwardly, a spindle rotatably mounted on the support, means controlled by the rearward movement of the sleeve to cause the spindle to rotate, and means associated with the spindle and the sleeve to hold the sleeve in a rearward position when the spindle is rotated.

6. In a device for using the power of an automobile engine to apply the brakes, a support, a plate slidable on the support, a lever pivoted to the plate, a flexible connection between the lever and the brake pedal, a spindle journalled in said support, a cam fixed to the spindle to engage the lever, and means to shift the plate to change the position of the fulcrum relative to the cam.

7. In a device for using the power of an automobile engine to apply the brakes, a support, a plate slidable on the support, a lever pivoted to the plate, a connection between the lever and the brake pedal, a spindle journalled in said support, a cam fixed to the spindle and engaging the lever, means to shift the plate to change the position of the fulcrum of the lever relative to the cam to enable a quick application of the brakes, a lug on the plate, a latch to engage the lug to hold the plate in the shifted position, and means carried by the cam to release the latch.

8. In a device for using the power of an automobile engine to apply the brakes, a slidable plate, a lever pivoted to the plate and connected to the brake pedal, a cam adapted to actuate the lever, means to shift the plate to shift the fulcrum of the lever relative to the plate, and means to hold the plate in the shifted position.

9. In a device for using the power of an automobile engine to apply the brakes, a lever connected to the brake pedal, means to actuate the lever, a cam engaging the lever and adapted to actuate the same, means to shift the fulcrum of the lever relative to the cam, and means to hold the fulcrum in the shifted position.

10. A clutch and brake control device for an automobile comprising a lever connected to the brake pedal and a lever connected to the clutch pedal, a support, a spindle journalled in said support, cams on the spindle engaging and adapted to actuate the levers, and means to cause the spindle to be rotated by power from the automobile engine.

11. In a motor vehicle having a steering wheel, clutch and brake levers, a shaft clutch coupled with the motor, cams on said shaft, pivoted bar levers controlled by said cams, connections between the bar levers and said clutch and brake levers respectively, and means adjacent said wheel to operatively control said shaft and motor clutch coupling.

12. In a motor vehicle having clutch and brake levers, a shaft driven by said motor, said shaft being shiftable lengthwise, a transverse spindle coupled to the shaft when in one position and uncoupled when in another, means for manually shifting said shaft into either position, means to return the shaft in adjustment, cams on said spindle, and means controlled by said cams to actuate said clutch and brake levers.

13. In a motor vehicle having clutch and brake levers, positive mechanical means actuated in common by the motor to operate said levers in sequence, manual means for setting said actuating means in operation, and means for releasing the actuating means.

In testimony whereof I affix my signature.

ANTHONY J. VASSELLI.